3,156,554
METHOD OF CONTROLLING RELATIVE STEM GROWTH OF PLANTS
Nathan E. Tolbert, Okemos, Mich., assignor to Research Corporation, New York, N.Y., a corporation of New York
No Drawing. Filed Jan. 31, 1963, Ser. No. 255,175
10 Claims. (Cl. 71—2.7)

This invention relates to a method of treating plants and, in particular, to a method of controlling the growth of plants whereby shorter and stockier plants are provided.

A further object is to provide a method of controlling plant growth whereby flowering occurs substantially earlier and the height above the ground of the first flower clusters is greatly reduced.

Further objects are to provide means for controlling plant growth whereby fewer leaves are found to subtend and the first inflorescence and flower numbers are increased.

Other objects are to provide means for controlling plant growth whereby the top root and leaf stem ratios of the plant are reduced.

These and other objects and advantages are provided by the method for controlling plant growth which comprises treating plants with a compound of the general formula $$R—N(CH_3)_3 \cdot Y$$

wherein R is a lower aliphatic group containing a non-ionizing nucleophilic substituent, such as haloalkyl, alkylene, haloalkylene, cyanoalkyl, mercaptoalkyl, alkoxyalkyl and epithioalkyl (alkylene sulfide) radicals, and Y is a non-phytotoxic anion.

It has been found that substances of the defined group such as (2-bromoethyl)trimethylammonium bromide; (2-chloroethyl)trimethylammonium chloride; (2,3-n-propylene)trimethylammonium bromide; (2,3-n-propylene)trimethylammonium chloride, (2-chloro-2,3-propylene)trimethylammonium chloride, (bromomethyl)trimethylammonium bromide, (2-bromopropyl)trimethylammonium bromide, (3-bromopropyl)trimethylammonium bromide, (4-bromobutyl)trimethylammonium bromide, (2-methoxyethyl)trimethylammonium chloride, (methoxymethyl)trimethylammonium chloride, (2-cyanoethyl)trimethylammonium chloride, (2-mercaptoethyl)trimethylammonium chloride, (2,3-epithiopropyl)trimethylammonium chloride and related compounds in aqueous solution at concentrations of $10^{-2}$ to $10^{-7}$ molar applied to either the foliage or root medium of plants greatly modify growth and flowering.

Compounds with the structure of $$XCH_2—CH_2—N(CH_3)_3$$

have been found to be particularly active as plant growth regulators and the trimethyl group of the amine is necessary for the activity. In general, the length of the ethyl side chain is optimum for maximum activity. Further, it appears that the X group should be a constituent which will create $+$ charge on the number 2 carbon of the ethyl chain. Thus (2-chloro- or 2-bromoethyl)trimethylammonium salts or (propylene)trimethylammonium salts are active at as low a concentration as $10^{-7}$ M or 0.1 p.p.m. while other compounds of the class should be used in higher concentration.

The active compounds of the invention are effective for controlling plant growth when they are applied to the soil in which the plants are grown, sprayed on the leaves of the plants, added to nutrient media, or applied by treating seeds with solutions or dry compositions containing the compounds. Generally, one treatment is effective on the total growth of the plant; however, repeated treatments increase the extent of the effect. The most characteristic growth alternations brought about by the treatment are shorter and thicker stems, broader and greener leaves, earlier and stronger tillering and more uniform growth in height. The compounds are effective over a wide range of temperatures suitable for plant growth. At low light intensities in the winter, the compounds are extremely effective whereas at high light intensities obtained in the summer, the compounds are less effective.

The following are illustrative methods of making the plant growth regulators of the invention:

One equiavlent of a dihalide aliphatic compound, for example, 1,2-dibromoethane, is put in a pressure flask containing 100 ml. toluene per mole of expected product. The flask is cooled in an ice bath and one equivalent of cold amine, i.e., trimethylamine, is added. The flask is sealed and allowed to stand overnight at a temperature sufficient for Equation 1, which results in the formation of a solid cake of reaction product. For the compound shown in Equation 2, this temperature is about 40° C.

$$(CH_3)_3N + CH_2Br—CH_2Br \rightarrow$$
$$CH_2Br—CH_2—N^+(CH_3)_3 \cdot Br^- \quad (1)$$

The solid cake of product is broken up and removed from the flask with the aid of more toluene and petroleum ether. The precipitate is filtered and washed with petroleum ether and recrystallized from either 100 or 95% ethanol, methanol or toluene. The bromo or chloro compounds are stable solids and can be stored indefinitely. They are exceedingly water soluble and are usable directly in controlling plant growth.

For dehydrohalogenation (Equation 2) one equivalent of the bromo compound is suspended in absolute ethanol (0.1 mole per 40 ml. ethanol) in a glass stoppered flask. To this suspension is added slightly more than an equivalent of KOH in absolute ethanol (0.1 mol in 100 ml. ethanol).

$$CH_2Br—CH_2—N^+(CH_3) \cdot Br^- \xrightarrow{KOH} CH_2=CH—N^+(CH_3)_3 \cdot Br^- \quad (2)$$

Any chunks of the halide compound should be broken up with a stirring rod and the flask stoppered and allowed to stand at room temperature for one hour or longer with occasional shaking. The solutions may be heated to assure complete dehalogenation. Insoluble KBr is filtered from the alcoholic solution and washed with absolute ethanol. The filtrate and washings are combined from which the unsaturated product will crystallize at $-20°$ C. overnight or the alcohol may be removed by flash evaporation at temperatures not greater than 30° C. and water added to make a 0.01 molar stock solution for use on plants. The pH need not be adjusted as the ammonium salts are already neutral.

EXAMPLE I

Thatcher wheat plants were grown in eight-inch clay pots containing a nearly equal mixture of sand and loam soil with some peat moss. Greenhouse temperatures were 56° F.±3 at night and 60° to 70° F. during the day. Supplementary light from 500 watt incandescent bulbs extended the day length to 16 hours.

(A) For root treatment, 500 ml. of solution of the growth regulator was poured once on the soil of each pot eleven days after planting the seed, at which time the second leaf was visible.

(B) For spray treatments, solutions of the chemical in water containing about 0.01% Aerosol OT as wetting agent, were sprayed on the leaves until they were wet.

Two weeks after treatment the distance from the base of the first leaf blade to the base of the second leaf blade for each plant was measured in millimeters. After some chemical treatments, negative values for this measurement were recorded to indicate the distance in mm. that the base of the second leaf blade lay below the base of the first leaf blade. In these cases the base of the second leaf blade had forced its way out through the sheath of the first leaf. The distance between the bases of the second and third leaf blade at this time was in a stage of rapid development and its length was not consistent even in the controls. Therefore four weeks after treatment the total stem height of the plants from the soil to the base of the last leaf blade was also recorded.

Table 1 summarizes the results of Example 1:

*Table 1*
LENGTH OF THATCHER WHEAT PLANTS AFTER TREATMENT WITH CHLOROCHOLINE CHLORIDE OR BROMOCHOLINE BROMIDE

| Treatment | Length Between the Base of the First and Second Leaf Blade | |
|---|---|---|
| | 2 weeks, mm. | 4 weeks, mm. |
| Control | 34 | 260 |
| (2-chloroethyl) trimethylammonium bromide: | | |
| $10^{-3}$ M | 5 | 75 |
| $10^{-4}$ M | 9 | 131 |
| $10^{-5}$ M | 13 | 171 |
| $10^{-6}$ M | 18 | 188 |
| (2-chloroethyl) trimethylammonium bromide, $10^{-3}$ to $10^{-7}$ molar foliage or root: | | |
| $10^{-2}$ M | 6 | |
| $10^{-3}$ M | 9 | |
| $5 \times 10^{-4}$ M | 14 | |
| (2-chloroethyl) trimethylammonium chloride: | | |
| $10^{-2}$ M | -3 | 78 |
| $10^{-3}$ M | 1 | 91 |
| $10^{-4}$ M | 7 | 139 |
| $10^{-5}$ M | 15 | 153 |
| $10^{-6}$ M | 23 | 200 |

EXAMPLE II

Tobacco plants were treated with (2,3-n-propylene)trimethylammonium bromide or (2-bromoethyl)trimethylammonium bromide by soil application in $10^{-2}$ to $10^{-5}$ molar solution. The stem internode distances were reduced to one tenth of normal and the plants were greener.

EXAMPLE III

Tomato plants have been treated with (2-chloroethyl)-trimethylammonium chloride, (2-bromoethyl)-trimethylammonium bromide, and (2,3-n-propylene)trimethylammonium bromide by spraying the leaves in concentrations of $10^{-3}$ to $10^{-5}$ molar aqueous solutions, by application to the soil in which the plants were grown of aqueous solutions of $10^{-3}$ to $10^{-7}$ molar concentration, and by supplying the compounds in nutrient cultures at molar concentrations of $10^{-3}$ to $10^{-7}$. In cases the plants flowered earlier and the heights of the first flower clusters were reduced. The compounds also stimulated the growth and flowering of lateral shoots in field tests.

EXAMPLE IV (2-chloroethyl)trimethylammonium bromide was applied through the soil to young sugar beet seedlings. The treatment of the seedlings stimulated growth as if the plants had received a cold treatment. Cold treatment is generally necessary to initiate flowering and to stimulate sugar accumulation in such plants.

EXAMPLE V (2-chloroallyl)trimethylammonium chloride was applied to wheat, cucurbits, chrysanthemums, grasses, and one year old apple and peach trees. In all cases concentrations of $5 \times 10^{-2}$ M to $10^{-5}$ M solutions were applied to the soil surrounding the roots of young seedlings. In subsequent growth of the plant the internodal distances were much shorter, the stems thicker, and the leaves darker green.

EXAMPLE VI (2,3-epithiopropyl)trimethylammonium chloride was applied to wheat, chrysanthemums and grasses by a soil drench with $5 \times 10^{-2}$ M to $10^{-5}$ M solutions. Subsequent growth of the plants was similar to that obtained with (2-chloroethyl)trimethylammonium chloride.

The following table includes quantitative data on the effectiveness of the treatments of Examples V and VI in reducing stem length of plants:

*Table II*

| Treatment | Height Reduction as Percent of Control | |
|---|---|---|
| | Wheat [1] | Squash [2] |
| (2-chloroallyl) trimethylammonium chloride: | | |
| $5 \times 10^{-2}$ M | 5 | 0 |
| $5 \times 10^{-3}$ M | 23 | 11 |
| $5 \times 10^{-4}$ M | 56 | 58 |
| $5 \times 10^{-5}$ M | 89 | 89 |
| (2, 3-Epithiopropyl) trimethylammonium chloride*: | | |
| $5 \times 10^{-2}$ M | 16 | |
| $5 \times 10^{-3}$ M | 31 | |
| $5 \times 10^{-4}$ M | 51 | |
| $5 \times 10^{-5}$ M | 80 | |

[1] Values are for the distance between the bases of the 1st and 2nd leaves, after soil treatment of seedlings 7 to 14 days of age as described in Example I.

[2] Values are of the first internode after treatment of squash seedlings as described in Example V.

The nature of the anion of the compounds is non-specific as the anion equilibrates with all other anions in the plant or in the soil when the compound is used. The following test data illustrate the wide range of non-phytotoxic anions which may be used:

Dow-1-chloride columns, each 1.5 cm. in diameter and 15 cm. long were prepared. Excess 1 M solutions of NaCl, $Na_2SO_4$, $Na_2HPO_4$, $NaNO_3$, $NaHCO_3$, NaOH, sodium formate, sodium acetate, sodium succinate and sodium citrate were also prepared and one solution was run through each column. The development of the columns was continued until the effluents gave a negative silver chloride test except in the case of the control column of NaCl. This procedure assured that each column was fully converted from its original chloride form to one of the other anions, such as Dow-1-sulfate, Dow-1-nitrate, Dow-1-acetate, etc. The columns were then washed exhaustively with distilled water to remove all excess salts.

A large volume of $10^{-2}$ M (2-chloroethyl)trimethylammonium chloride was prepared from a sample synthesized as previously described. 100 ml. aliquots were slowly passed through each of the Dow-1-resins with the various anions. The volume of resin was 26 fold in excess of that calculated to exchange the chloride anion of the growth regulator for the anion on the resin. An additional 900 ml. of distilled water was washed through each column and the total effluents then amounted to one liter of a $10^{-3}$ M solution of the corresponding salt of the (2-chloroethyl)trimethylammonium cation. The solutions were used directly in the plant tests as described below. These solutions gave a negative chloride test except for the control which had been run through a Dow-1-chloride resin.

12 to 15 Thatcher wheat seedlings were planted in 4-inch disposable pots. After development of the primary leaf, to each pot was added 90 ml. of a (2-chloroethyl)-trimethylammonium cation in the form of the salt and molarity as designated in Table III. As previously described the effect of the growth regulator on the plants was measured. All preparations of the growth regulator, regardless of which salt preparation was used, were equally effective. Even $10^{-5}$ M solutions of any of these salts greatly retarded the elongation of the wheat seedlings. Treatments were run in duplicate and the whole experiment repeated with another preparation of the growth regulator.

Table III

| Treatment | Height in mm. of first interleaf distance |
|---|---|
| None | 13 |
| (2-chloroethyl) trimethylammonium chloride: | |
| $10^{-3}$ M | 1 |
| $10^{-4}$ M | 2 |
| $10^{-5}$ M | 4 |
| (2-chloroethyl) trimethylammonium sulfate: | |
| $10^{-3}$ M | 1 |
| $10^{-4}$ M | 3 |
| $10^{-5}$ M | 4 |
| (2-chloroethyl) trimethylammonium phosphate: | |
| $10^{-3}$ M | 0 |
| $10^{-4}$ M | 2 |
| $10^{-5}$ M | 3 |
| (2-chloroethyl) trimethylammonium nitrate: | |
| $10^{-3}$ M | 0 |
| $10^{-4}$ M | 2 |
| $10^{-5}$ M | 5 |
| (2-chloroethyl) trimethylammonium bicarbonate: | |
| $10^{-3}$ M | 0 |
| $10^{-4}$ M | 2 |
| $10^{-5}$ M | 4 |
| (2-chloroethyl) trimethylammonium hydroxide: | |
| $10^{-3}$ M | 1 |
| $10^{-4}$ M | 2 |
| $10^{-5}$ M | 5 |
| (2-chloroethyl) trimethylammonium formate: | |
| $10^{-3}$ M | 0 |
| $10^{-4}$ M | 3 |
| $10^{-5}$ M | 6 |
| (2-chloroethyl) trimethylammonium acetate: | |
| $10^{-3}$ M | 1 |
| $10^{-4}$ M | 2 |
| $10^{-5}$ M | 5 |
| (2-chloroethyl) trimethylammonium succinate: | |
| $10^{-3}$ M | 1 |
| $10^{-4}$ M | 1 |
| $10^{-5}$ M | 3 |
| (2-chloroethyl) trimethylammonium citrate: | |
| $10^{-3}$ M | 0 |
| $10^{-4}$ M | 2 |
| $10^{-5}$ M | 4 |

From the foregoing specification, it will be seen that the present invention fully accomplishes the aims and objects specifically set forth herein and as will be apparent to those skilled in the art, suitable variations or changes in the methods of treating plants may be made without departing from the inventive concepts as defined in the appended claims.

This application is a continuation-in-part of my applications Serial No. 832,448, filed August 10, 1959, and Serial No. 47,141, filed August 3, 1960, both now abandoned.

I claim:

1. A method of controlling the relative stem growth of plants consisting of treating plants with a compound of the formula $$R-N(CH_3)_3 \cdot Y$$

wherein R contains not less than two and not more than three carbon atoms and is selected from the group consisting of haloalkyl, alkylene, haloalkylene, cyanoalkyl, mercaptoalkyl, alkoxyalkyl and epithioalkyl, and Y is a nonphytotoxic anion in an amount effective to reduce relative stem growth without causing phytotoxic effects.

2. The method defined in claim 1 wherein R is 2-haloalkyl containing not less than two and not more than three carbon atoms.

3. The method defined in claim 1 wherein R is alkylene containing not less than two and not more than three carbon atoms.

4. The method defined in claim 1 wherein R is a 2-haloalkylene containing not less than two and not more than three carbon atoms.

5. The method defined in claim 1 wherein R is 2,3-epithioalkyl containing not less than two and not more than three carbon atoms.

6. The method defined in claim 1 wherein R is 2-chloroethyl.

7. The method defined in claim 1 wherein R is 2-bromoethyl.

8. The method defined in claim 1 wherein R is 2,3-n-propylene.

9. The method defined in claim 1 wherein R is 2-chloroallyl.

10. The method defined in claim 1 wherein R is 2,3-epithiopropyl.

References Cited in the file of this patent

UNITED STATES PATENTS

| | | |
|---|---|---|
| 2,751,713 | Abramitis | June 26, 1956 |
| 2,970,048 | Hamm et al. | Jan. 31, 1961 |

OTHER REFERENCES

Plant Regulators, National Academy of Science, National Research Council, Publication 384, pages b, c, 1, 14 and 15, June 1955.